C. NORDSTROM.
LATHE TAPER ATTACHMENT.
APPLICATION FILED AUG. 18, 1916.
1,222,021.
Patented Apr. 10, 1917.
2 SHEETS—SHEET 1.
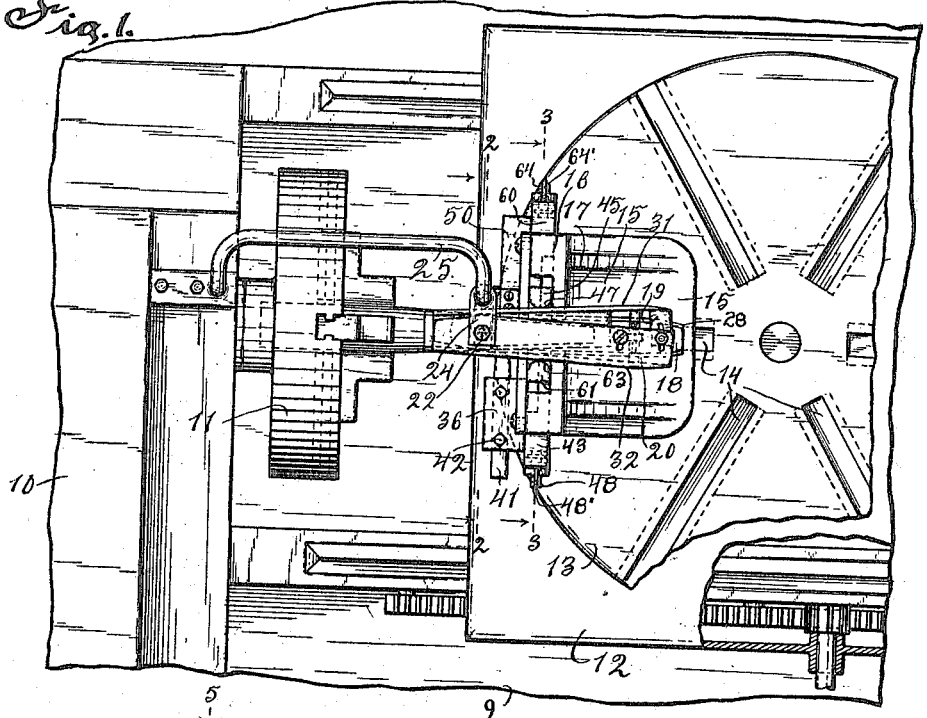
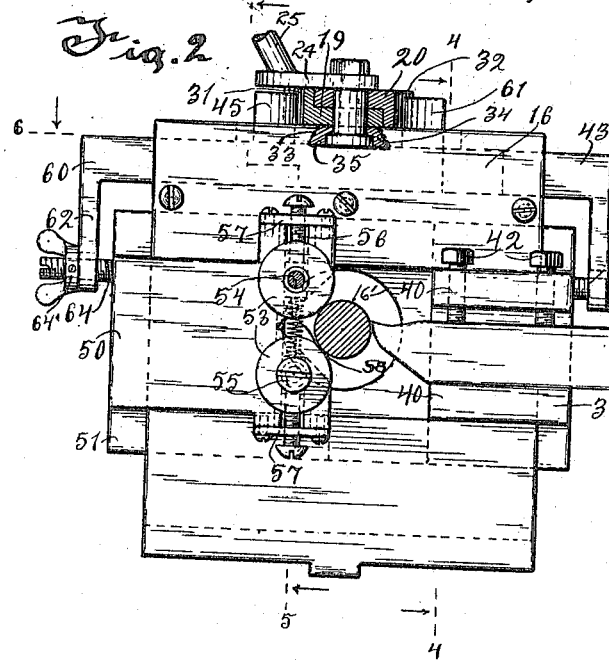
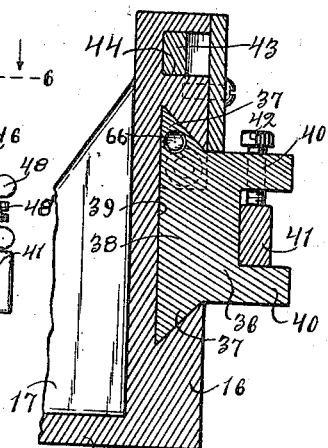
INVENTOR
Charles Nordstrom
Worsell, Keeney & French
ATTORNEYS

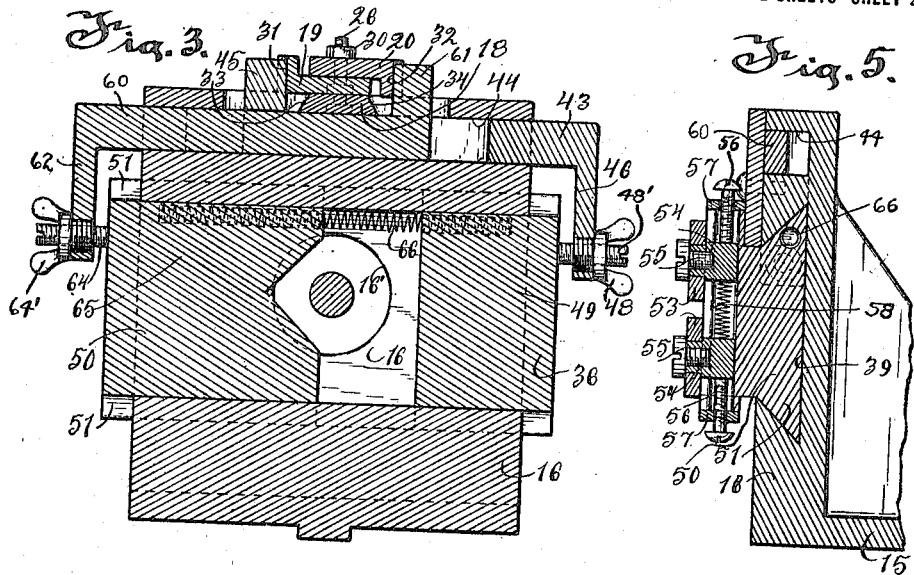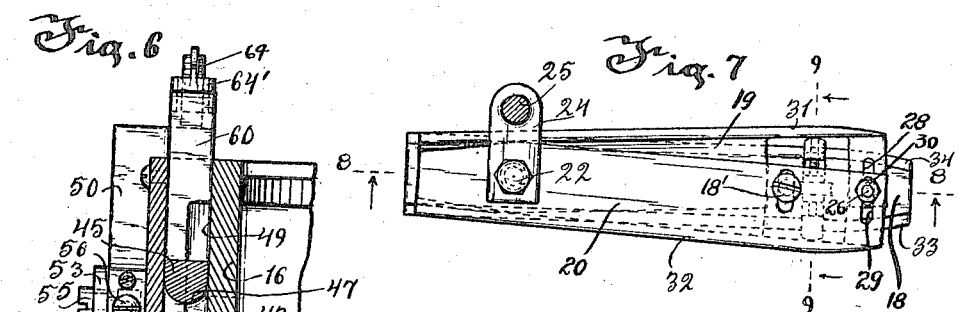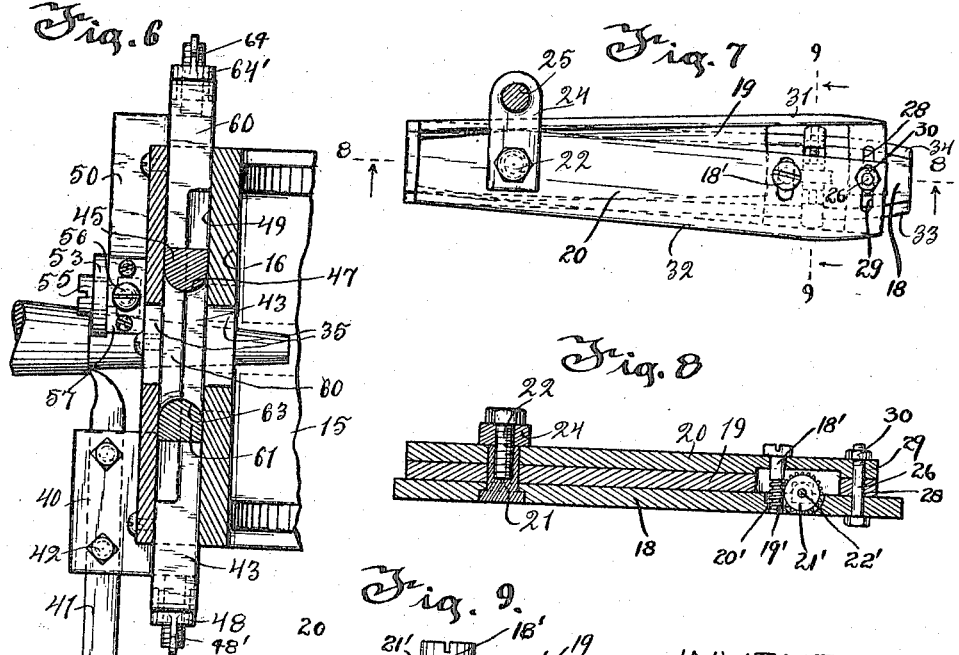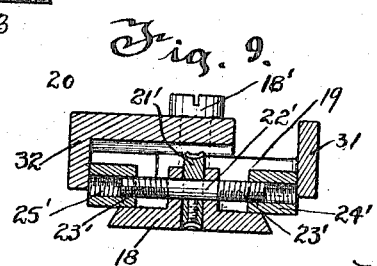

UNITED STATES PATENT OFFICE.

CHARLES NORDSTROM, OF MILWAUKEE, WISCONSIN.

LATHE TAPER ATTACHMENT.

1,222,021.

Specification of Letters Patent.

Patented Apr. 10, 1917.

Application filed August 18, 1916. Serial No. 115,637.

*To all whom it may concern:*

Be it known that I, CHARLES NORDSTROM, a citizen of the United States, and resident of Milwaukee, in the county of Milwaukee and State of Wisconsin, have invented new and useful Improvements in Lathe Taper Attachments, of which the following is a description, reference being had to the accompanying drawings, which are a part of this specification.

The invention relates to lathe taper attachments more particularly adapted for use with turret lathes.

The invention is designed to provide a simple form of attachment for cutting tapers and means for backing the work while the cut is being made.

The invention is further designed to provide a lathe taper attachment which may be easily adjusted to serve as a guide for cutting tapers of any angles desired.

The invention further consists in the several features hereinafter set forth and more particularly defined by claims at the conclusion hereof.

In the drawings:

Figure 1 is a top view of a portion of a turret lathe provided with the improved taper attachment;

Fig. 2 is a section taken on the line 2—2 of Fig. 1;

Fig. 3 is a section taken on the line 3—3 of Fig. 1;

Fig. 4 is a section taken on the line 4—4 of Fig. 2;

Fig. 5 is a section taken on the line 5—5 of Fig. 2;

Fig. 6 is a section taken on the line 6—6 of Fig. 2;

Fig. 7 is a detail view of the taper attachment;

Fig. 8 is a section taken on the line 8—8 of Fig. 7.

Fig. 9 is a section taken on the line 9—9 of Fig. 7.

Referring to the drawings the numeral 9 indicates the frame of an ordinary turret lathe, 10 the headstock, 11 the chuck revolubly mounted thereon, 12 the carriage slidably mounted on the frame, 13 the revoluble table or turret provided with the usual grooves 14 into one of which a portion of the attachment is inserted and secured thereto in the usual manner.

The attachment comprises a support including base plate 15 adapted to be secured to the turret in any suitable manner, a taper guide device, a tool guide coöperating with the taper device to guide the tool to make the cut and means for backing the work adjacent the tool.

The support is provided with a vertical plate 16 which is reinforced by flanges 17 connected to the base 15. The plate 16 has an aperture 16' therein to permit the passage of the work therethrough.

The taper guide device comprises a relatively stationary member 18 and angularly adjustable members 19 and 20 pivotally connected to the member 18 by a pivot bolt 21, the bore of which is threaded to receive a bolt 22. The bolt 22 also passes through a lug 24 on a holding arm 25 of usual construction and which is usually furnished as an attachment for turret lathes. The holding arm is bolted to the head of the lathe and is curved to clear the chuck and work, said arm serving to hold the device against longitudinal movement. The members 19 and 20 are adapted to be angularly disposed with respect to each other and to the fixed member 18 and to be secured in adjusted position by a bolt 26 which passes through slots 28 and 29 in the members 19 and 20 respectively and is provided with a nut 30 to clamp the members together. The outer sides 31 and 32 of the members 19 and 20 are flat and the outer sides 33 and 34 of the member 18 are beveled to slidably fit in a slot 35 in the portion 16 of the base, the members 19 and 20 being slidably mounted on the top of the portion 16. The members 19 and 20 are L-shaped so that the side 31 of the member 19 overlaps the adjacent side of the member 20 and the side 32 of the member 20 overlaps the adjacent side of the member 19 to provide a broad bearing surface for the tool guiding means hereinafter described. The members 19 and 20 are adapted to be set for cutting different tapers by means of an operating screw 18' which is provided with a groove 19' for receiving a pin 20' to pivotally mount said screw in the member 18 but prevent endwise movement thereof. This screw extends through suitable openings in the members 19 and 20 and is in mesh with a worm wheel 21' mounted on a shaft 22' journaled in the member 18. The ends 23' of the shaft 22' are oppositely threaded to receive threaded sleeve 24' and 25' which are adapted to bear against the sides 31 and 32 respectively. The turning of the operating screw 18' will through the worm wheel 21' and shaft 22' permit the sleeves 24' and 25' be brought nearer together or farther apart as desired to adjust the members 19 and 20 for the taper.

This tool guiding means comprises a tool holder whose movement is controlled by the taper device. The tool holder consists of a tool block 36 having outwardly beveled portions 37 at its lower end 38, which end is horizontally slidably mounted in a groove or guideway 39 in the outer face of the plate 16. The tool block is provided with outwardly extending lugs 40 for receiving the tool 41 which is secured in position by set screws 42 mounted in one of the lugs and bearing against one side of the tool to seat it against the other lug. The tool holder is controlled by the taper device through a connection consisting of a slide 43 mounted in a guideway 44 in the upper face of the plate 16 and having an upwardly projecting arm 45 and a depending arm 46. The inner face 47 of the arm 45 is curved and adapted to engage the outer side 31 of the member 19. The arm 46 is adjustably connected to the tool holder by an adjustable threaded sleeve 48 mounted in the arm and a screw 48' adjustably mounted in the sleeve and adapted to bear against the end of the tool holder. With this construction it will be apparent that as the turret together with the plate 16 is moved away from the head stock, the tool will be carried by it and as it moves away the member 19 will engage the arm 45 moving it inwardly and consequently moving the slide 43 together with the tool holder inwardly to cause the tool 41 to make the taper cut.

In order that the work may be suitably backed or braced while the cut is being made I have provided a backing means for the work opposite the tool 41. This backing means consists of a block 50 having an outwardly beveled portion 51 slidably mounted in the inwardly beveled guideway 39, means carried by said block for engaging the work and means controlled by the taper device for moving the block.

The work engaging means carried by the block 50 consists of spaced apart rollers 53 journaled on adjustable stud block 54 to which they are secured against endwise movement by bolts 55, and means for connecting said stud blocks to the block 50. Any suitable form of adjustable backing blocks may be used in place of the rollers to engage the work. This connecting means consists of adjusting screws 56 having their threaded ends passing through threaded apertures in lugs 57 on the block 50 and bearing against the block 54 which are held apart by a spring 58 whereby said blocks 54 together with the rollers 53 may be moved toward or away from each other depending upon the size of the work to be cut, said rollers adapted to bear on opposite sides of the work as shown in Fig. 2.

The means controlled by the taper device for moving the block consists of a slide 60 mounted in the guideway 44 in the upper face of the plate 16 and having an upwardly projecting arm 61 and a depending arm 62. The inner face 63 of the arm 61 is curved and adapted to engage the outer side 32 of the member 20. The arm 62 is adjustably connected to the block 50 by an adjustable threaded sleeve 64' mounted in the arm and a screw 64 adjustably mounted in said sleeve and adapted to bear against the end of the block 50. With this construction it will be apparent that as the turret together with the attachment support is moved away from the head stock, the backing means including the rollers 53 will be carried by it and as the device moves away the member 20 will engage the arm 61 moving it outwardly and consequently moving the slide 60 together with the block 50 and rollers 53 inwardly against the work and thus back the work while the tool 41 is making the cut. A spring 66 is seated in recesses in the blocks 50 and 36 to normally hold said members apart.

As the operation of the tool guide and the backing means has been described in connection with the description whereby the taper guides 19 and 20 control the movement of said tool guide and said backing means respectively a further explanation is deemed unnecessary. The taper guide device when once set always remains in the same position with reference to the head stock and plate 18 being slidably mounted in the slot 35 in the plate 16 as previously described. To cut different tapers all that is necessary is to adjust the members 19 and 20 to the desired angle of taper and lock them in position by tightening up the bolts 26.

The invention thus exemplifies a taper lathe attachment wherein the work is braced while the tool is making the cut.

I am aware that the specific construction herein shown and described is capable of considerable variation and modification and I therefore do not wish to limit myself to this construction but consider any structure coming within the scope of the appended claims to be within the spirit of my invention.

What I claim as my invention is:

1. A lathe taper attachment comprising a movable support, a taper guide device slidably mounted thereon comprising a relatively fixed member and a pair of adjustable taper guide members, a tool holder slidably mounted on said support and operatively connected to one of said taper guide members, and a work-backing member slidably mounted on said support opposite to the tool holder and operatively connected to the other taper guide member.

2. A lathe taper attachment comprising a movable support, a taper guide device comprising a relatively fixed member and a pair of adjustable taper guide members, a tool holder movably mounted on said support and operatively connected to one of said taper guide members, and a work-backing member movably mounted on said support opposite to the tool holder and operatively connected to the other taper guide member.

3. In a lathe taper attachment, a taper guide device comprising a fixed member, a pair of taper guide members pivotally connected to said fixed member, and means for adjusting said members at an angle to said fixed member.

4. In a lathe taper attachment, a taper guide device comprising a fixed member, a pair of taper guide members pivotally connected to said fixed member, and means for simultaneously adjusting said taper guide members at an angle to said fixed member.

In testimony whereof, I affix my signature.

CHARLES NORDSTROM.

Copies of this patent may be obtained for five cents each, by addressing the "Commissioner of Patents, Washington, D. C."